United States Patent
Marks

(10) Patent No.: US 7,282,653 B2
(45) Date of Patent: Oct. 16, 2007

(54) WEIGHING DEVICES

(75) Inventor: Peter John Marks, Albert Park (AU)

(73) Assignee: Mountcastle Pty Ltd., Queensland (AU)

( * ) Notice: Subject to any disclaimer, the term of this patent is extended or adjusted under 35 U.S.C. 154(b) by 0 days.

(21) Appl. No.: 11/580,907

(22) Filed: Oct. 16, 2006

(65) Prior Publication Data

US 2007/0068708 A1 Mar. 29, 2007

Related U.S. Application Data

(62) Division of application No. 10/515,214, filed on May 20, 2005, now Pat. No. 7,156,918.

(30) Foreign Application Priority Data

May 23, 2002 (AU) ...................... PS2521

(51) Int. Cl.
*G01G 3/00* (2006.01)
*G01G 23/20* (2006.01)
(52) U.S. Cl. ...................... 177/126; 177/148; 177/225; 73/862.391

(58) Field of Classification Search ........... 73/862.391, 73/862.621; 177/126, 148–149, 225; 116/DIG. 32
See application file for complete search history.

(56) References Cited

U.S. PATENT DOCUMENTS

| | | | | |
|---|---|---|---|---|
| 3,082,561 A * | 3/1963 | Convey et al. | ................ | 43/11 |
| 5,319,162 A * | 6/1994 | Ness | ........................... | 177/231 |
| 5,396,035 A * | 3/1995 | Studanski | .................... | 177/132 |
| 5,416,279 A * | 5/1995 | Tseng | .......................... | 177/132 |
| 5,852,258 A * | 12/1998 | Tribou | ........................ | 177/126 |
| 5,895,893 A * | 4/1999 | McMillian | .................. | 177/126 |
| 6,978,671 B1 * | 12/2005 | Meggs et al. | ................. | 73/149 |
| 2003/0208110 A1 * | 11/2003 | Mault et al. | | |

* cited by examiner

*Primary Examiner*—Randy W Gibson
(74) *Attorney, Agent, or Firm*—Stites & Harbison PLLC; Ross F. Hunt, Jr.

(57) ABSTRACT

A piece of luggage, rucksack or satchel is provided having a pair of spaced shoulder straps. At least one strap has a stress/strain unit to monitor the stress/strain in the strap as the piece is worn on the shoulder of a user. The at least one strap also has an indicator that provides a visual indication when the stress/strain of the strap has exceeded a predetermined threshold.

5 Claims, 7 Drawing Sheets

WEIGHING DEVICES

CROSS-REFERENCE TO RELATED APPLICATIONS

This application is a divisional of application Ser. No. 10/515,214, filed May 20, 2005, now U.S. Pat. No. 7,156,918, which is hereby incorporated by reference.

FIELD OF THE INVENTION

This invention relates to weighing devices and in particular relates to devices that provide a ready indication of the weight of a piece of luggage.

BACKGROUND OF THE INVENTION

Commercial aircraft have to place strict controls on the amount and weight of luggage that passengers carry on the aircraft. Tourists and international travelers often experience difficulties in ascertaining the weight of their luggage and this can result in fines and surcharges for being overweight. Whilst the check-in counters have scales that accurately weigh luggage it is often then too late for a passenger to re-organize his or her luggage. What is needed and what is apparently absent from the marketplace today is a simple means of providing an indication of the weight of a piece of luggage so that passengers can determine the weight of the luggage before they reach the airport.

The issue of overweight luggage also has serious ramifications with regard to health and safety considerations. Heavy suitcases, rucksacks or satchels can cause serious spinal injuries. Research has indicated that children, and/or adults, should not over lengthy periods transport more than 10% of their weight.

It is these needs that have brought about the present invention.

SUMMARY OF THE INVENTION

According to one aspect of the present invention there is provided a weighing device for providing a ready indication of the weight of a piece of luggage comprising load bearing means adapted to be placed through a carry handle of the piece of luggage and indicator means associated with the load bearing means whereby when the luggage is lifted via the load bearing means or carry handle the load bearing means is subjected to the mass of the piece of luggage and the indicator means provides an indication if a predetermined threshold mass has been exceeded.

According to a further aspect of the present invention there is provided a piece of luggage having a carry handle assembly comprising a handle connected to the piece of luggage, a pressure plate under the handle, a load cell between the pressure plate and the handle and means to provide an indication of weight coupled to the load cell wherein when the piece of luggage is lifted by the handle, the weight of the piece of luggage is transmitted to the load cell by contact with the pressure plate.

DESCRIPTION OF THE DRAWINGS

Embodiments of the present invention will now be described by way of example only with reference to the accompanying drawings in which.

DESCRIPTION OF THE PREFERRED EMBODIMENTS

Figure 2:
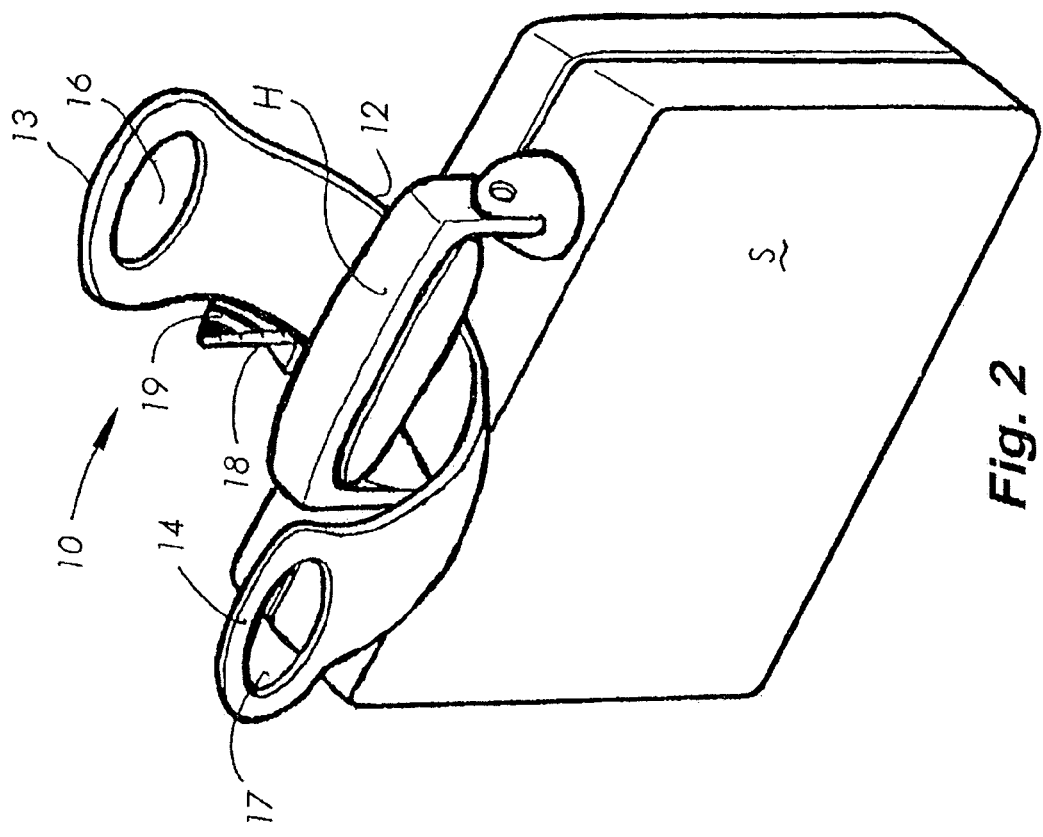
FIG. 2 shows the device when placed under load.
Figure 1:
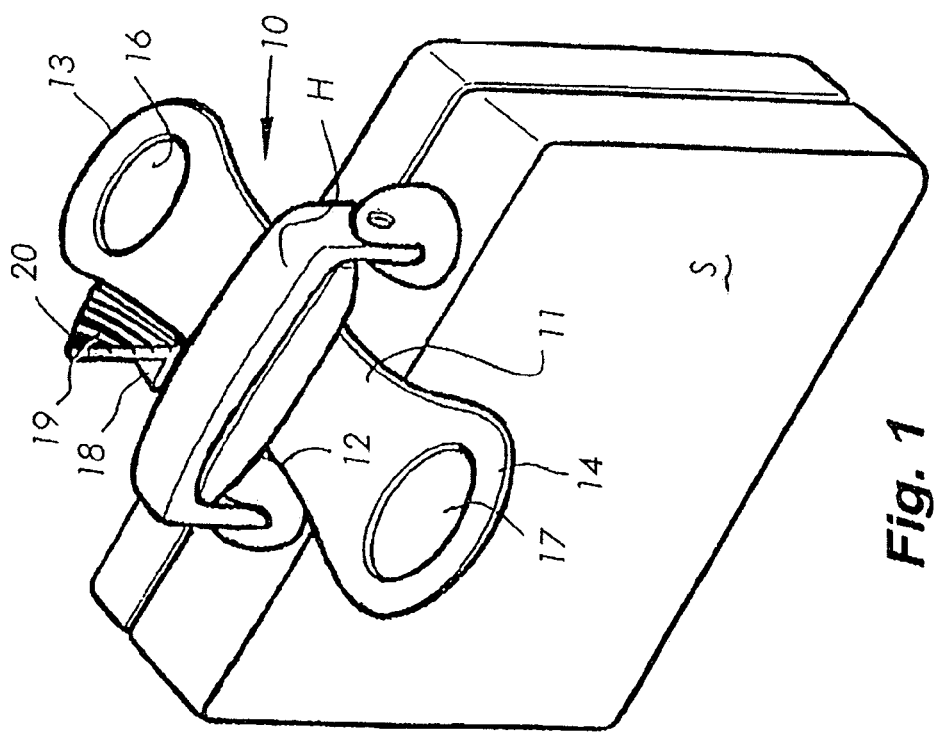
FIG. 1 illustrates a first embodiment of a weighing device which is inserted under a handle of a suitcase.

The first embodiment of the weighing device 10 shown in FIGS. 1 to 3 comprises an elongate flat strip 11 of sturdy yet flexible material usually plastics or metal having a central waisted portion 12 with enlarged end portions 13 and 14 each containing apertures 16 and 17. An upstanding flange 18 is attached to the underside of the central portion of the waisted portion. The flange has an upward projection 20 having a calibrated forward face 19.

Figure 3A:
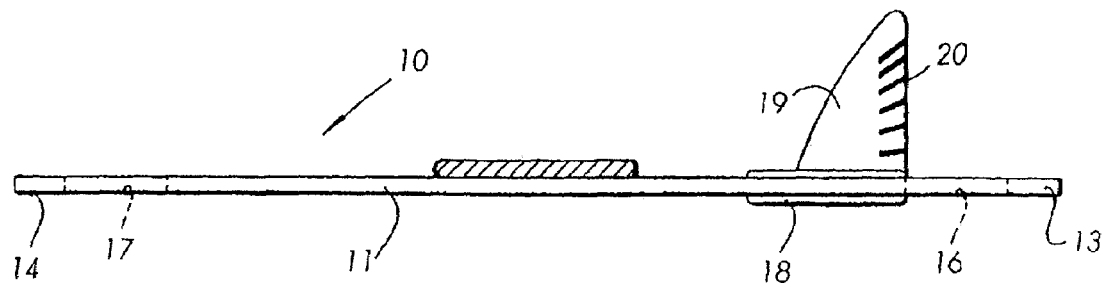
FIGS. 3a, 3b and 3c are side view of the device under varying loads.

To use the device to weigh suitcase S the elongate strip 11 is placed under the handle H of the suitcase S as shown in FIGS. 1 and 3a.

Figure 3B:
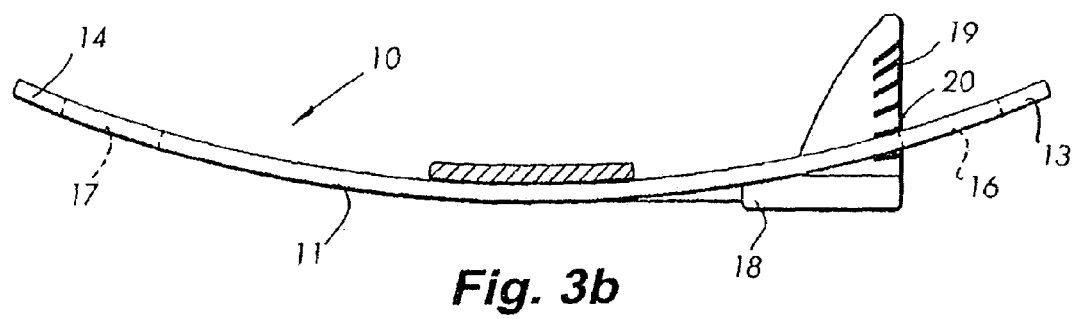
Figure 3C:
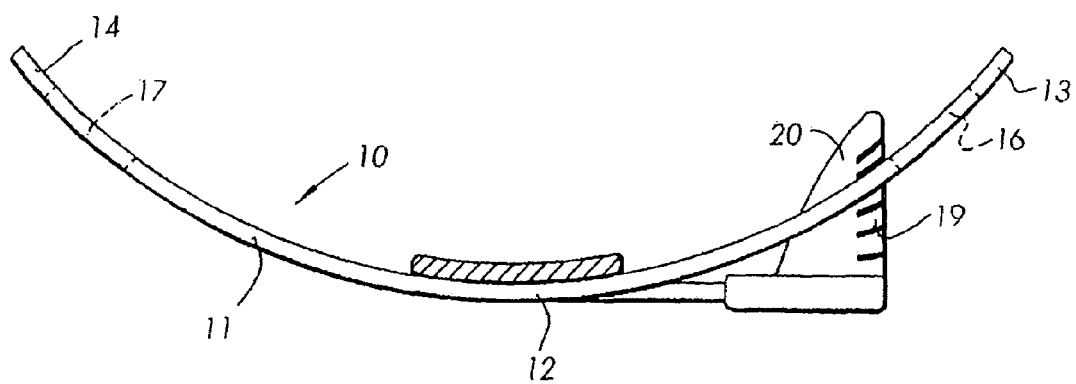
Figure 4:
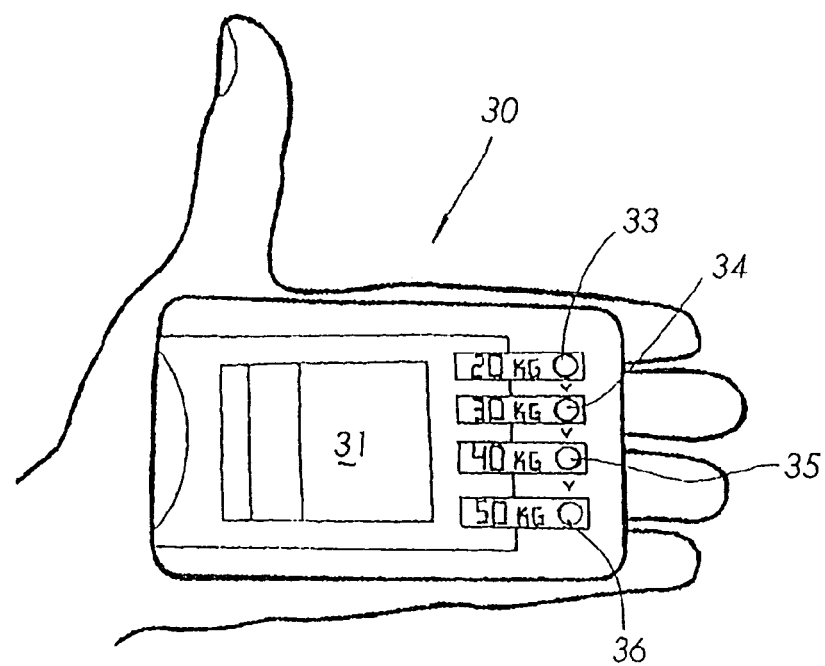
FIG. 4 illustrates a second embodiment of a weighing device supported by a hand.

By gripping the strip 11 by pressing fingers through the apertures 16 and 17 the suitcase S can be lifted via the strip 11. As shown in FIGS. 2, 3b and 3c, the mass of the suitcase causes the ends 13, 14 to bend upwards against the calibrated scale 19 which then provides a ready indication of the weight of the suitcase S. It is envisaged that the calibrated scale 19 would include prominent marks that show the weight levels as determined by airlines for both economy and business class travel. Once the adjacent edge of the elongate strip has moved past one of these lines the user will be aware that the suitcase is above the prescribed limit.

FIG. 3a shows the strip 11 carrying no load, FIG. 3b shows a ready indication of a light load whilst FIG. 3c illustrates the effect of a heavy load. The thickness and flexibility of the strip is selected to ensure the regular degree of movement against the calibrated scale.

The device 10 is about the size of an airline ticket and thus takes up very little room so that it can be simply carried in hand luggage.

Instead of the mechanical device described with reference to FIGS. 1 and 3, it is understood that the strip 11 could carry suitably positioned strain gauges which would provide an electrical signal that could be correlated to the weight to which the strip is subjected. The strip 11 could also include a pressure sensitive chamber positioned directly under the handle to absorb the mass of the suitcase. The chamber could include a chemical substance that changes color under load so that a change to a selected color would indicate that the weight of the piece of luggage has exceeded a particular threshold.

It is understood that the chemical make-up of pressure sensitive pads or chemical substances that change color under load would be known to those skilled in the art.

In the second and third embodiments shown in FIGS. 4 to 7, the weighing device 30 is handheld and is in the form of a substantially flat credit card shaped unit. The unit incorporates a sensor panel 31 on its upper surface that senses downward pressure on the panel. The panel incorporates a load cell that is coupled to a liquid-crystal display (LCD) 32 and a suitable battery power source. The load cell senses the pressure on the sensor panel and converts the pressure to an indication of weight.

Figure 5:
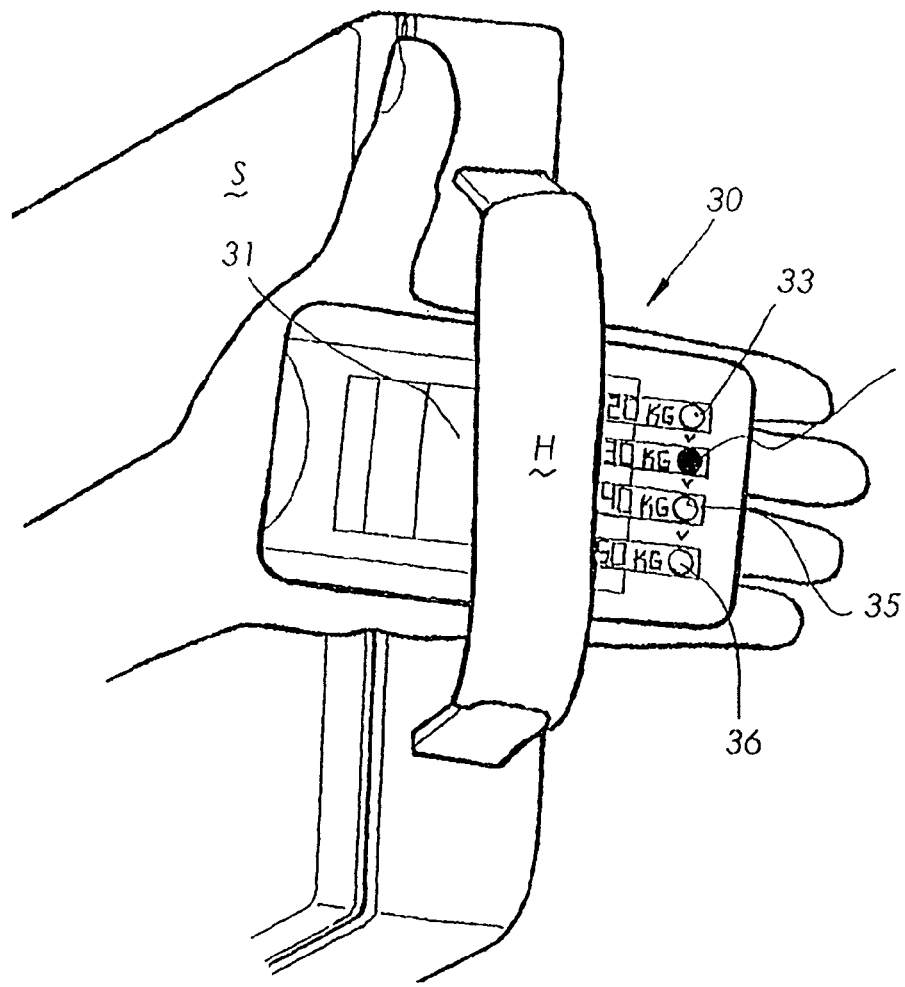
FIG. 5 shows the device of FIG. 4 when held under the handle of a suitcase to weigh the suitcase.
Figure 6:
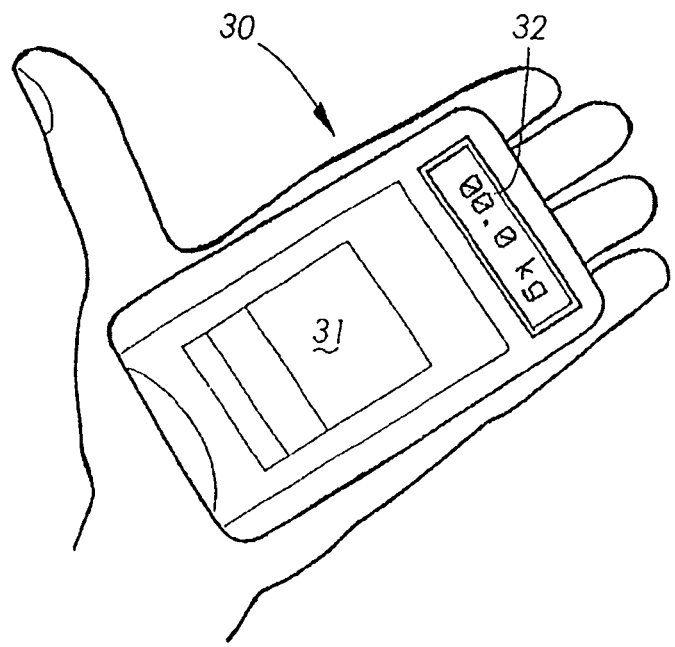
FIG. 6 illustrates a third embodiment in which a weighing device is also supported by a user's hand.
Figure 7:
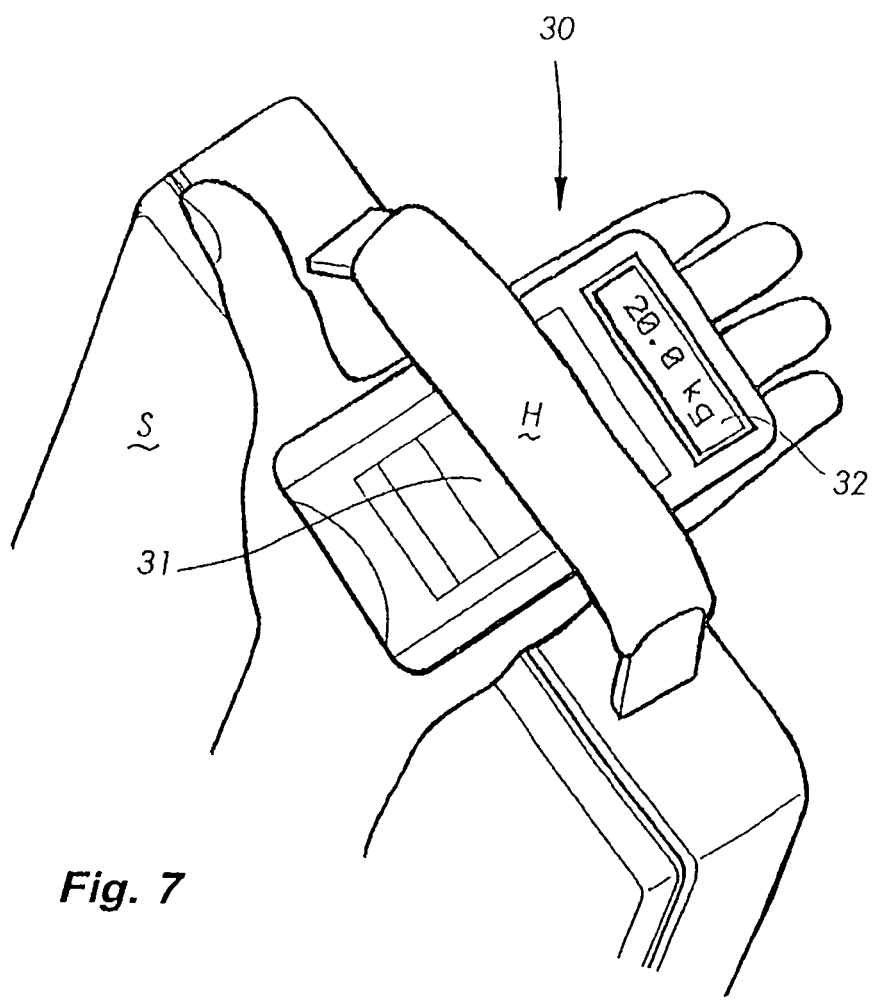
FIG. 7 shows the device of FIG. 6 when inserted under the handle of a suitcase to weigh the suitcase.

In the embodiment shown in FIGS. 6 and 7, the device is placed on the palm of a hand as shown in FIG. 6. The hand is then placed under the handle 4 of the suitcase S as shown in FIG. 7 and the suitcase is lifted so that the weight of the suitcase presses down on the sensor panel 31 on the upper surface of the device. This pressure is then transmitted as a weight on the liquid crystal display 32. In the embodiment shown in FIGS. 4 and 5, instead of a liquid crystal display a series of lights 33, 34, 35, 36 representing recommended weights such as 20 kg, 30 kg, 40 kg or 50 kg are provided. The lights are preferably light emitting diodes. When the device is slid under the handle as shown in FIG. 5, the appropriate light 34 is illuminated showing that the suitcase is at least as shown in FIG. 5 30 kg. Alternatively, the 20 kg, 40 kg or 50 kg lights 33, 35 or 36 can illuminate. The device 30 thus provides a ready and simple means of showing that a predetermined weight has been exceeded. The device of both of these embodiments is very small, runs on a small watch battery and takes up very little space. It is understood that the pressure sensitive panel would be one of a number of proprietary items that provide an electrical signal that is proportional to pressure.

In the fourth and fifth embodiments shown in FIGS. 8 to 12, a weighing device 40 is incorporated into the handle 4 of the suitcases.

Figure 8:
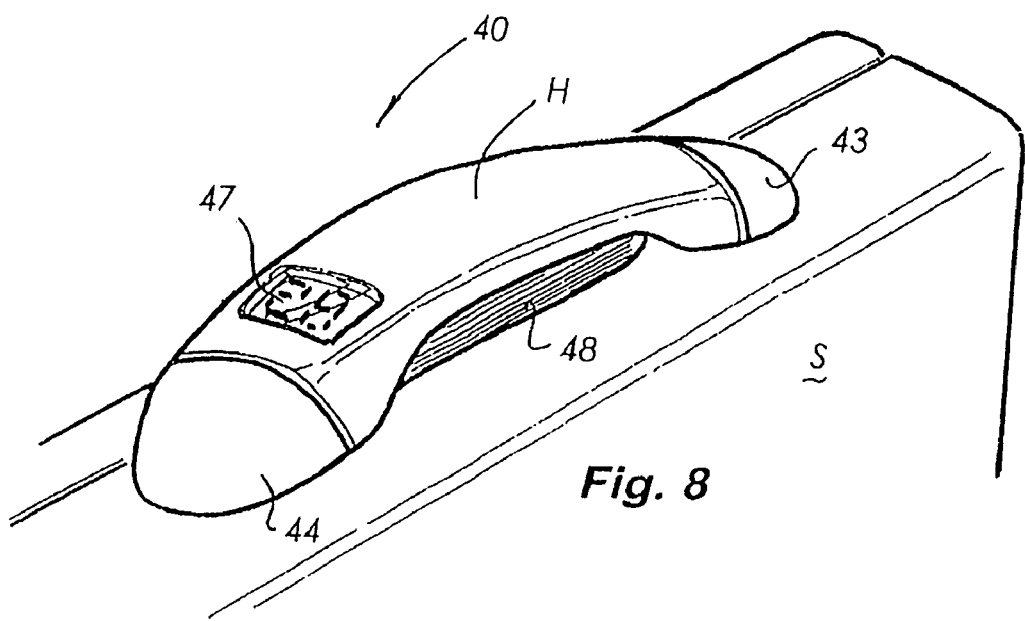
FIG. 8 illustrates a fourth embodiment in which a weighing device is incorporated into the handle of suitcase.
Figure 9:
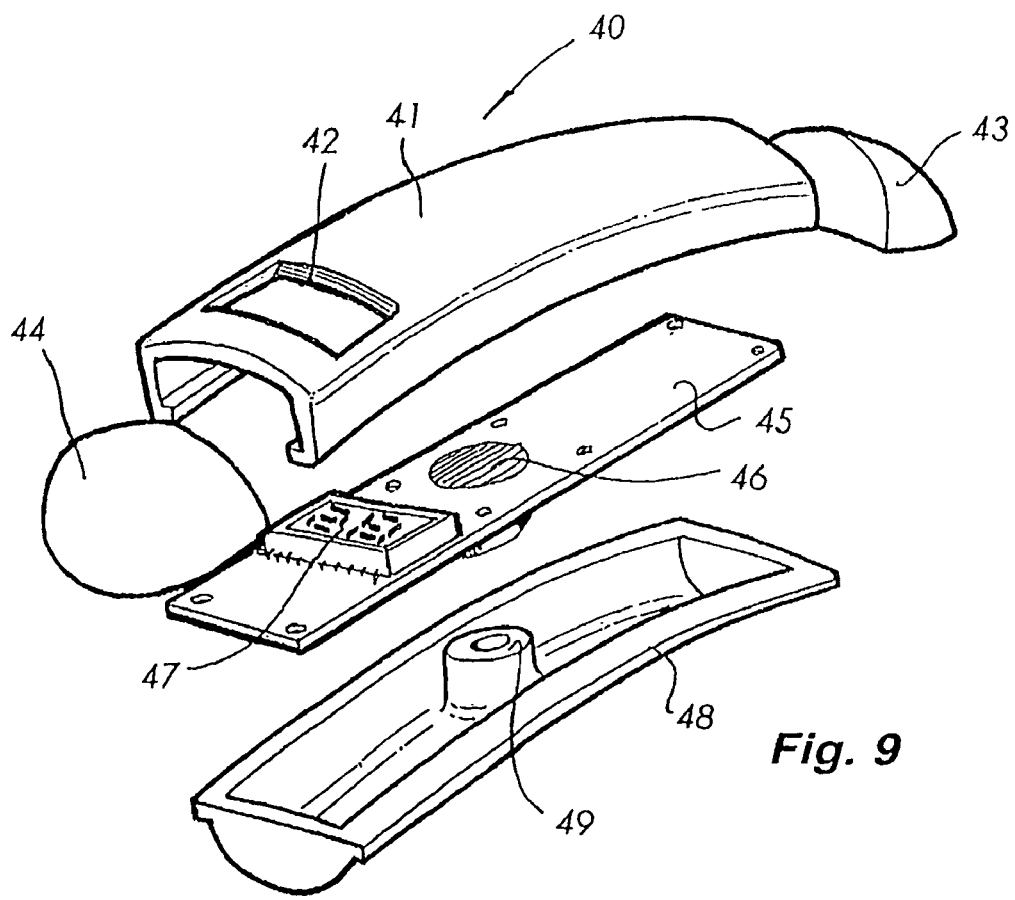
FIG. 9 is an exploded view of the handle assembly of FIG. 8.
Figure 10A:
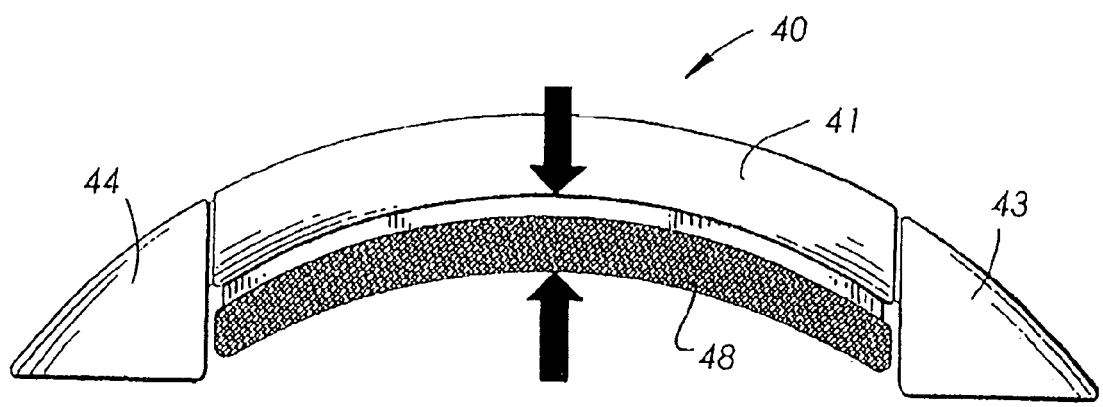
FIGS. 10a and 10b are schematic side elevational views of the handle of FIG. 8 when free standing and under load.
Figure 10B:
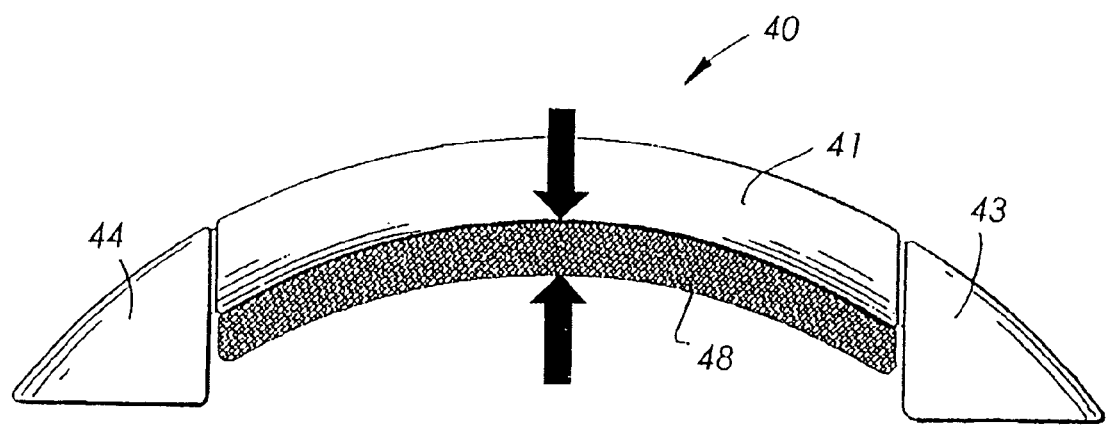

In the exploded view of FIG. 9, the handle assembly 40 comprises an upper housing 41 with an aperture 42. The housing is of an arcuate shape and supports end portions 43, 44. The housing 41 is arranged to contain a circuit board assembly 45 that includes a pressure sensitive mechanism 46 and a liquid crystal readout 47. The assembly would also incorporate a battery to power the weighing device. The assembly terminates on the underside with an arcuate displaceable pressure plate 48 that has a central spigot 49 that rides on the pressure sensitive mechanism 46 of the circuit board 45. As shown in FIGS. 10*a* and 10*b*, the pressure plate 48 is pulled up into the assembly 40 against the pressure sensitive plate 46 as the handle H is gripped and the suitcase S lifted off the ground. In this way, the weight of the suitcase S is transferred through the pressure sensitive plate to be recorded and indicated at the LCD readout 47. The final assembly of the handle is shown in FIG. 8 from which it can be seen that the weighing device 40 is elegantly integrated into the design of a suitcase S so that travelers can buy a range of luggage each of which has its own built-in weighing device.

The assembly is molded in plastics and is light and substantially the same size as a conventional handle. In order to prolong the life of the batteries that power the unit, it is understood that an on/off switch may be provided somewhere on the handle to prevent use of the assembly whenever the suitcase is carried.

Figure 11:
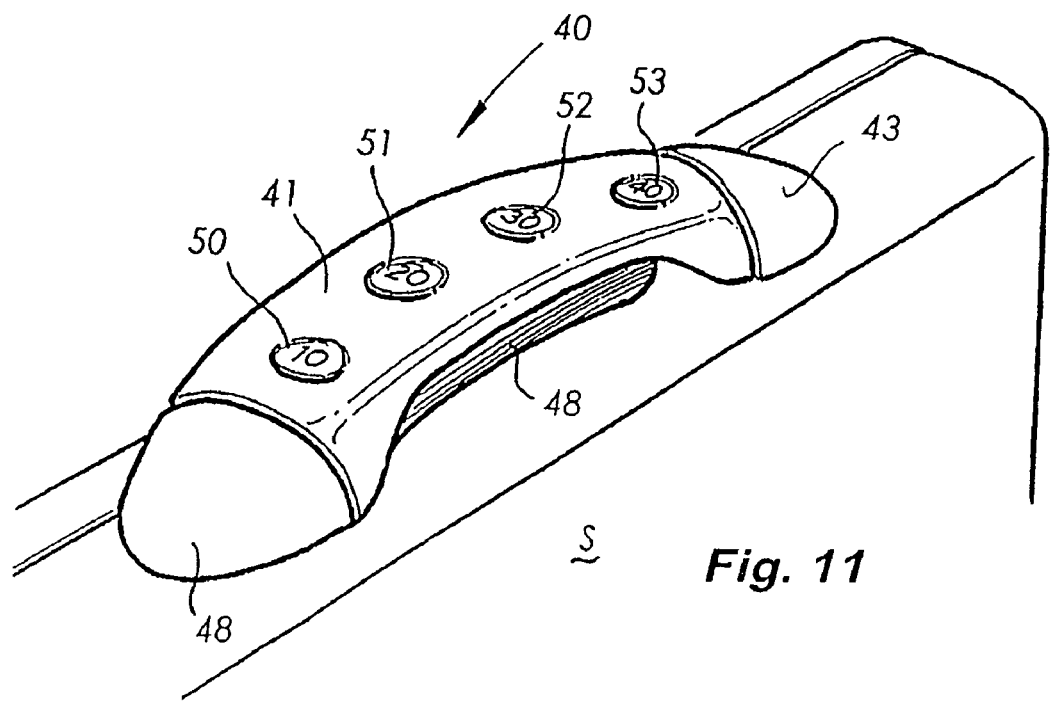
FIG. 11 is an illustration of a variation of the fourth embodiment.

In the embodiment shown in FIG. 11, a very similar device 40 is incorporated except in this case instead of a single LCD readout 47, four space lights 50, 51, 52, 53 are provided across the top of the handle H, each light representing a threshold weight such as 10 kg, 20 kg, 30 kg or 40 kg.

The load cell between the pressure plate 48 and the top of the handle 41 would send electrical signal to each light in dependence on the weight of the suitcase.

Figure 12:
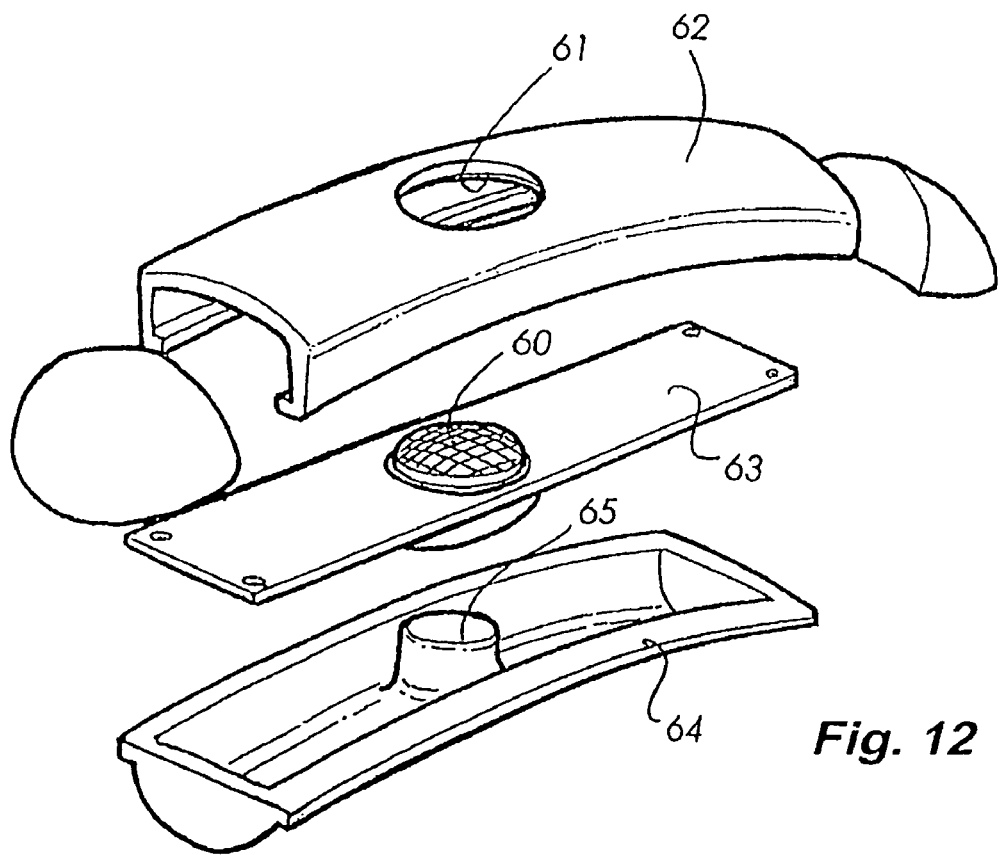
FIG. 12 is an exploded view of the handle assembly in accordance with a fifth embodiment.

In the embodiment shown in FIG. 12, the load cell is replaced by a colored indicator 60 which locates in an aperture 61 in the external cover 62 of the handle. The colored indicator 60 is mounted on a support plate 63 and a pressure plate 64 has a single upstanding spigot 65 that acts against the underside of the colored indicator 60 in the same manner as the spigot acts on the load cell in the embodiment of FIGS. 9 to 11. However, in this embodiment the colored indicator is in the form of a disc that changes color under pressure and thus changes color proportional to the weight of the suitcase. As the pressure increases the color of the disc can be calibrated so that a change to a particular color indicates that the luggage weighs more than a particular threshold.

Other embodiments not illustrated also incorporate the use of pressure sensitive chemicals that change color in dependence on pressure. A card or plastics sheet could be provided with bands of such chemicals. The card or sheet could be placed under the handle of the suitcase and the suitcase lifted via the card or sheet. In this way, the weight of the suitcase would place pressure on the chemical laminate causing a change of color and the color would be calibrated to indicate whether airline thresholds have been exceeded.

The invention is also applicable to rucksacks or satchels especially those used by school children to carry their text books and laptops. The common practice of school children transporting excessively heavy loads in satchels and/or rucksacks is well known.

What is claimed:

1. A weighing device for providing a ready indication of the weight of an article, the device comprising load bearing means comprising an elongate strip of flexible material having a load bearing center portion between ends and indicator means associated with the strip, the strip being adapted to be placed on or form part of the carry means of the article, whereby when the article is lifted by gripping the ends, the strip flexes relative to the indicator means due to the load on the center portion and the indicator means provides an indication of the weight of the article.

2. The weighing device according to claim 1, wherein each end has a hole which defines a finger grip enabling the strip to be picked up.

3. The weighing device according to claim 1, wherein the indicator means is a calibrated scale fixed to the center portion adjacent one lateral edge of the strip whereby the edge moves relative to the scale as the strip flexes under load.

4. The weighing device according to claim 3, wherein the calibrated scale provides an indication of the weight limit for airline passengers.

5. The weighing device according to claim 1, wherein the strip and indicator means are molded in plastic.

* * * * *